C. HORNBOSTEL.
PRODUCTION OF CHLORINE GAS.
No. 423,868. Patented Mar. 18, 1890.
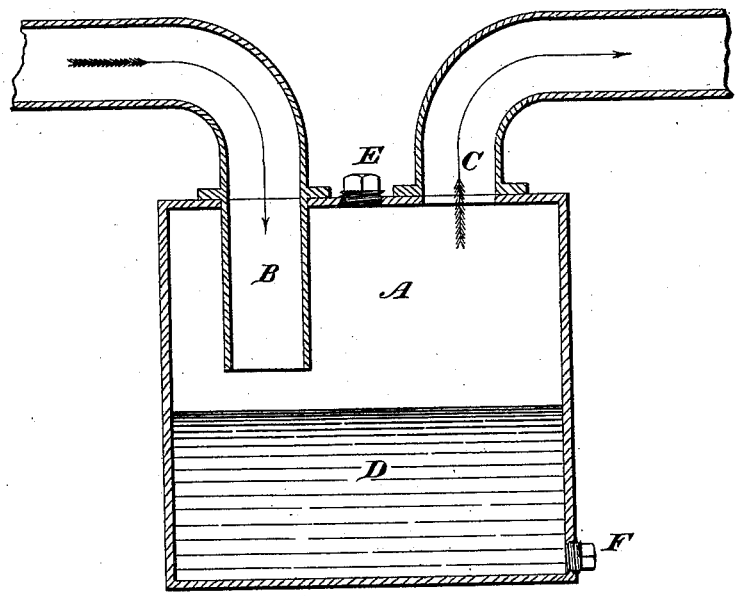
WITNESSES
By his Attorney
INVENTOR
Charles Hornbostel.

UNITED STATES PATENT OFFICE.

CHARLES HORNBOSTEL, OF BROOKLYN, NEW YORK.

PRODUCTION OF CHLORINE GAS.

SPECIFICATION forming part of Letters Patent No. 423,868, dated March 18, 1890.

Application filed February 16, 1876.

*To all whom it may concern:*

Be it known that I, CHARLES HORNBOSTEL, of Brooklyn, in the county of Kings and State of New York, have invented certain new and useful Improvements in an Improved Process for the Improvement of Combustion; and I do hereby declare that the following is a full, clear, and exact description of the invention, which will enable others skilled in the art to which it appertains to make and use the same, reference being had to the accompanying drawing, and to the letters of reference marked thereon, which form a part of this specification.

This invention relates to a new method of bleaching and oxidizing vegetable and animal fibrine matters and minerals by the action of a current of air impregnated with chlorine gas.

The object of my invention is to simplify and cheapen the application of chlorine by a continuous process of generating the gas and applying it at the same time; also, to open thereby entirely new applications to purposes for which its use was impracticable when the chlorine gas had to be obtained by the methods hitherto in use for purposes of art and commerce.

My invention consists in forcing, by means of an air pump or blower, a current of air under pressure into and through a mixture of sulphuric acid, common salt, and black oxide of manganese, and in then leading the current of air which has absorbed chlorine gas to its place of use.

In the accompanying drawing is shown a sectional view of an apparatus adapted for use in carrying out my invention.

In carrying out my invention I mix the sulphuric acid and salt with black oxide of manganese in the proper proportions, which may be the same as usually used. These materials I place in a vessel, substantially as shown at A in the drawing, into which leads a pipe B from an air-forcing apparatus which projects downward toward the bottom upon which the materials are placed, or enters said vessel in such a manner as to cause the air to strike with force upon, enter into, and mix with the compound.

The introduction of the induct-pipe B into the vessel A depends in a great measure on the air-forcing apparatus which I use. In using a ventilator which imparts no positive pressure and force to a current of air, I do not extend a pipe B far enough down into the vessel A to become immersed in the contents of the vessel A; but in this case the air is discharged from pipe B upon the surface of the materials when I use the manganese in lump form. The effect which I obtain from this contact of the atmospheric air with the materials is of sufficient oxidizing energy for carrying out the object of my invention. In using an air-pump I extend the pipe B into vessel A sufficiently far to be immersed in the materials.

In treating liquid solutions into which the chlorous gas has to be introduced by a positive pressure, I make use of an air-pump. I do not limit myself to any special air-forcing apparatus, but resort to and select the one best adapted for producing and applying the effect produced by leading a current of air under pressure into intimate contact with the materials stored in a receptacle for this purpose. From the top extends a pipe C, by which the admixture of gas and air is conducted to the place of use. The materials are introduced into the vessel through a hole in its top closed by a screw-plug E, and may be drawn off through another opening at the bottom closed by the plug F. Upon forcing a current of air through the induction-pipe, so as to agitate the mass of materials or come intimately in contact therewith, the decomposition will commence and continue until thoroughly completed, and the gas will be taken up as it is generated and thoroughly commingled with the air, and in this condition can be effectively applied to the intended purposes.

By the ordinary process in practical use of preparing chlorine gas for purposes of art and commerce from black oxide of manganese and hydrochlorine sulphuric acid and salt, the complete decomposition of the materials can only be effected by aid of heat, which, besides being expensive and requiring refractory and highly non-corrosive vessels for its generation, offers no effective means of applying the gas after it is generated to the purposes intended.

The general practice in use, and that which furnishes the source of nearly all the chlorine gas used now for purposes of art and commerce, consists in leading the chlorine gas after it has become evolved by means of heat from the materials aforesaid while held in retorts into a mass of lime, when the lime serves as an absorbent of the chlorine, and in this form the latter becomes transportable and made use of. By means of my improved process I am thus enabled to produce the gas without the aid of applied heat, which effects a material saving in the production, and enables me to employ in the construction of the generating-vessels comparatively inexpensive materials—such as wooden vessels lined with lead—instead of the expensive glass or platinum vessels or vessels of highly non-corrosive materials, which heretofore have been found necessary, and have added much to the expense of producing chlorine gas, and at the same time my invention affords an effective means for applying the gas continuously and directly after it is made.

I have discovered that where the application of chlorine gas as obtainable from the methods of its production in general use proved impracticable, and also too destructive in its effect, the application of a current of air impregnated with chlorine gas in the manner described above accomplished the desired effect, having reference to the oxidation of fibrine matters in vegetable and animal oils and fats, preventing thereby an ultimate decomposition of these by reason of the presence of oxidizable matters.

For the purposes to which I apply my process the pure chlorine gas as heretofore produced could not be applied to advantage.

I make use of my process in the treatment of ores for eliminating the sulphur in roasting-furnaces, and for converting the metallic components into oxides, chlorides, and chlorates. The pure chlorine gas is not adapted for this purpose. I apply my process further in the combustion of sulphurous coal, all of which I am enabled to do because my process affords opportunities to impart to the blast any desired proportions of the components of the compound of sulphuric acid, salts, or its chemical equivalent, and manganese, and said adjustment of proportions of air and of chemicals enables me by means of my process to generate an atmosphere of any desired oxidizing or chloridizing energy, while chlorine gas proper is of a stable composition and cannot be applied for the purposes enumerated.

The features of my process of preparing and applying chlorine gas from the methods known and in use consist, first, in the agency utilized by me for setting the gas free from the materials yielding them—viz., the agitation exerted on these materials by the force of a current of air under pressure instead of heat; second, in the continuity of the process, the generation and application of the chlorine gas forming one and the same matter instead of two distinct processes.

I do not claim as my invention simply the production of chlorine gas from black oxide of manganese, common salt, and sulphuric acid without heat, as I am aware that it is not new to produce that gas from such materials in the cold; but I am aware that chlorine gas, in conjunction with atmospheric air, has been heretofore employed for bleaching purposes, and this I do not claim, broadly. I am not aware, however, that atmospheric air has ever been employed to assist in the generation of chlorine gas, or as a vehicle for its application, which forms the essential features of my invention.

Having thus described my invention, what I claim is—

The within-described improvement in the production and application of chlorine gas, the same consisting in forcing a continuous current of air at ordinary temperature into the generating-vessel and through the materials from which said gas is generated, and conducting the air-current charged with the generated gas from the generating-vessel to the point where the gas is to be applied, the chemical decomposition being aided and expedited by the agitation of the materials in the generating-vessel caused by the passage of the air-current, and the latter also serving as a vehicle for carrying the resulting gas to the point where it is to be used, substantially as described.

In testimony that I claim the foregoing as my own I affix my signature in presence of two witnesses.

CHARLES HORNBOSTEL.

Witnesses:
WARD W. SWEET,
JACOB BARKER.